March 20, 1951     J. W. BLINKMAN     2,545,646
UNIVERSAL JOINT

Filed Feb. 28, 1947     2 Sheets-Sheet 1

Inventor
J. W. Blinkman
By Arthur H. Sturges
Attorney

March 20, 1951      J. W. BLINKMAN      2,545,646
UNIVERSAL JOINT
Filed Feb. 28, 1947      2 Sheets-Sheet 2
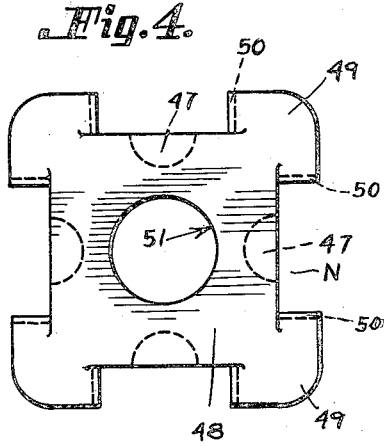
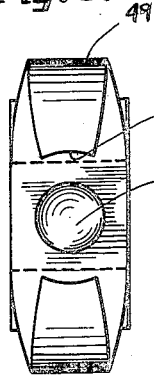
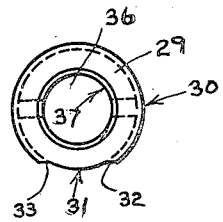
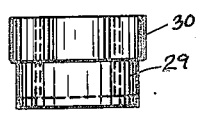
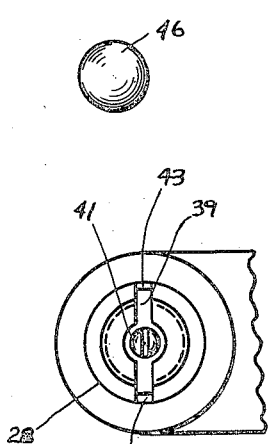
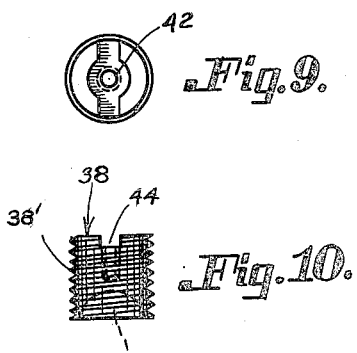
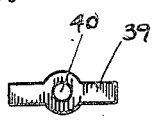
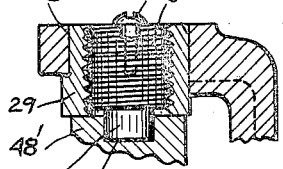
Inventor
J. W. Blinkman
By Arthur H. Sturges
Attorney Patented Mar. 20, 1951

2,545,646

UNITED STATES PATENT OFFICE 2,545,646

UNIVERSAL JOINT

John W. Blinkman, Omaha, Nebr.

Application February 28, 1947, Serial No. 731,669

1 Claim. (Cl. 64—17)

The present invention relates to automobiles, parts thereof and, more particularly, to the universal joints of automobile propeller shafts.

It is an object of the invention to provide a universal joint of a sturdy, particular construction for permitting the propeller shaft of a vehicle to be driven by the engine shaft of the vehicle at times when said shafts are out of alignment with respect to each other and in a more advantageous manner than heretofore.

Another object of the invention is to provide a device for the above stated purposes which may be readily taken apart, for disconnecting a driver shaft from a driven shaft, by an employment of a screw-driver or a like simple tool.

Other and further objects and advantages of the invention will be understood from the following detailed description thereof.

As heretofore practiced in the art, universal joints for automobile use have depended on an employment of peened pins for coupling a driver shaft to a driven shaft, and it is well known to automobile mechanics that these pivot pins become fatigued through use, requiring frequent replacement of the pins with an attendant expense. It is also well known that the said pins or bolts become worn and loose permitting an undue amount of lost motion after a short period of use, said lost motion being known in the vernacular of the art as "whip" whereby an automobile starts forwardly with a jerk to the discomfort of occupants and the present invention aims to obviate certain undesirable factors of the prior practice.

In the drawings:

Figure 4 is a face view of a motion transmitting block employed.

Figure 5 is an edge view of the block shown in Figure 4.

Figure 6 is a plan view of an apertured bushing employed.

Figure 7 is a side view of the bushing shown in Figure 6.

Figure 8 is a view of one of four like steel balls preferably employed.

Figures 9 and 10 are respectively an end view and a side view of a threaded socket plug employed.

Figure 11 is a plan view of a detent employed on the end of the plug shown in Figure 9.

Figure 12 is a plan view of the bushing, plug, and detent assembled together with respect to a yoke arm of the new universal joint, said arm being shown fragmentarily.

Figure 13 is a transverse section of a modification of the construction shown in Figure 10 and assembled on an arm of a yoke of the new device.

Figure 1:
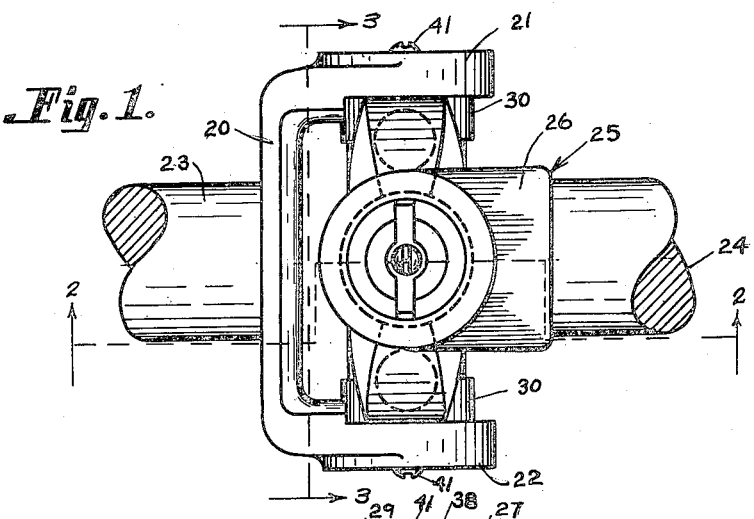
Figure 1 is a top plan view of a universal joint embodying the present invention.

Referring now to the drawings for a more particular description, the new device includes a yoke 20 which is approximately C-shaped, as shown in Figure 1, since it is provided with oppositely disposed arm portions 21 and 22.

The yoke 20 may be formed integral with or welded to a shaft 23, the latter being a driver shaft or a driven shaft, as desired, during operation.

Figure 2:
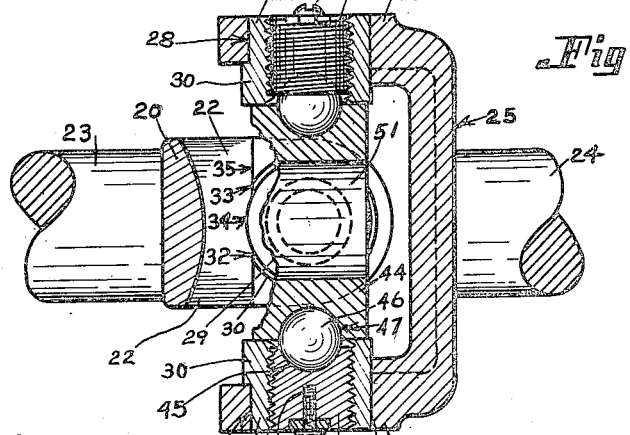
Figure 2 is a sectional view of the new device shown in Figure 1, the view being taken at an angle of ninety degrees with respect to the showing thereof in Figure 1, said section being taken approximately on line 2—2 of Figure 1.

A similar shaft 24 is similarly secured to the main body portion of a like C-shaped member or second yoke 25, the arms 26 and 27 thereof being spaced apart and disposed in approximate parallelism, as shown in Figure 2.

The arms of the two yokes are of like construction being disposed spaced apart, said spacing being such that the four arms are disposed approximately ninety degrees apart with respect to each and in parallelism with respect to each other at times when the shafts 23 and 24 are aligned, as shown in Figure 1.

Each of the four arms, adjacent their ends, are provided with an aperture or bore 28 for respectively receiving a bushing 29, snugly therein. Four bushings 29, each of a like construction, are employed.

The bushings 29 are each provided with an outstanding lug portion or collar 30 whereby at times when the main body portions of the lugs are manually disposed in the apertures 28 of the arms respectively, said lugs 30 prevent the bushes from moving outwardly away from their respective arm and from the center of the assembly.

As best shown in Figure 6, the lugs 30 of the bushings 29 extend a major portion of the entire distance around the perimeter of the bushings, each being provided with a step-cut surface portion 31 whereby oppositely disposed shoulders 32 and 33 are provided on each bushing.

Referring to Figure 2, the arm 22 of the C-shaped yoke 20 is provided with a notch 34 which is arcuate in plan, as shown, for a reception of the step-cut portion 31 of the adjacent bushing 29 therein, whereby the shoulders 32 and 33 of the bushing abut snugly against the straight wall portion 35 of the arm 22 for preventing the bushing from rotating with respect to the arm 21 while at the same time, during use, the bushing 29 is prevented from longitudinal sliding movements in one direction with respect to its arm by means of the lug or collar 30 of the bushing, sliding movements in an opposite direction being prevented by a later described block. All of the bushings and arms employed are of the same construction with respect to their respective portions 31, 32, 33, 34 and 35.

Each bushing 29 is provided with an axially disposed aperture 36, having a screw thread 37 provided on the annular wall thereof, as shown in Figure 6, for receiving a socket plug 38 therein.

As shown in Figure 10, each socket plug 38 is provided with a screw thread 38' on the outer wall thereof. The threads 38' of the plugs are complemental to the threads 37 of the bushings 29 whereby the plugs are threadedly engaged with their respective bushings during use as shown in Figure 2.

In order to prevent the socket plugs 38 from becoming unseated during use, resultant from vibration or the like, each plug 38 is locked to its respective bushing 29 by means of a detent such as the detent 39 shown in Figure 11.

Each of the four detents 39 employed are provided with a medial aperture 40. Set screws 41 extend through the apertures 40 of the four detents respectively. The shanks of the screws 41 are rotatably engaged respectively with the complemental threads provided on the walls of the recesses 42 of the outer end of each socket plug 38.

The wider ends of the bushes 29 are, as best shown in Figure 12, provided with oppositely disposed notches 43 and as best shown in Figure 10, each socket plug 38 is provided with a transversely disposed slot 44.

Since the detents 39 are each of a greater length than the diameter of their respective socket plug 38 and of a lesser length than the diameters of their respective bushing 29, said detents are received in said notches and recesses respectively, as shown in Figure 12, for locking the parts together in a position of use.

The inner ends of each plug 38 are each provided with a socket 45. The latter are each of approximate semi-globular contour for respectively snugly receiving therein approximately a one-half portion of the four steel balls 46 employed and for purposes later described.

The other half portions of the balls are received in the recesses 47 respectively of a coupling block 48. The recesses 47 of the motion transmitting block 48 are equi-distantly spaced apart as best shown by dotted lines in Figure 4.

At each corner of the block 48, an outstanding wing 49 is provided, said wings being disposed cruciform with respect to each other whereby a notch N is provided between each two of the wings, as best shown in Figure 4. Both ends of each wing 49 are provided with like concave surfaces 50, as best shown in full lines in Figure 5 and by dotted lines in Figure 4. The surfaces 50 of each wing, as shown in Figure 4, are disposed at a right angle with respect to each other.

Figure 3:
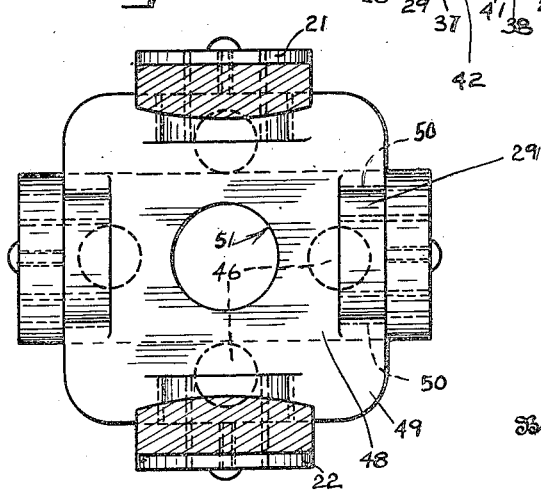
Figure 3 is a transverse section taken on line 3—3 of Figure 1.

The surfaces 50 are segmental in plan, as shown in Figure 5, the curvatures thereof being complemental to the main body portion diameters of the bushings 29. The collars of the bushings 29 are snugly received between the concave surfaces 50 of oppositely disposed wings respectively of the motion transmitting coupling block 48, as best shown in Figure 3.

The block 48 is preferably provided with a medially disposed bore or aperture 51 for providing a construction of lighter weight.

It will be seen that at times when the above described parts are connected together, as shown in Figures 1 and 2, that at times when the shaft 23 is rotated, that the block 48 communicates rotary motion to the shaft 24, since at least one wall or concaved surface 50, of a wing 49, will be in contact with a bush 29 for causing the same, whereby stress is not applied directly, or only to a minor extent, to the balls 46 and their adjunct parts.

The balls 46 permit a pivotal movement of the block with respect to the shafts at times when the latter are not in alignment during use.

It will be seen that as described most of the strain is relieved from the ball-bearings 46 and that the force exerted between the two shafts is transferred from the surfaces 50 of the block. The surfaces 50 are disposed so that they are each disposed in parallelism with the line between the corresponding pivotal connections of their respective arms. Also, each of the surfaces 50 is disposed for exerting force on the respective ones of the arms, in operation, along the line transverse to a line between those two opposite ones of said connections which connect each said one arm and the block.

Referring to Figure 13, the modified form of construction there depicted employs a plug 38' having an axle portion 60 formed integral therewith. The stub axle 60 is received in a recess 61 provided in a block 48' not fully shown. As shown in Figure 13, the block 48', the stub 60 fits snugly in the recess 61 for pivotal movements such as heretofore described with respect to the block 48 and with the exception of substitution of the four stubs 60 and the recesses 61 for the balls 46 and the sockets 47, the construction and operation is the same.

At times when the modified form is employed, the construction of the present invention includes four stub axles and necessary adjunct parts in lieu of the four balls of the preferred construction.

From the foregoing description, it is thought to be obvious that a universal joint assembly, constructed in accordance with my invention, is particularly adapted for use by reason of the convenience and facility with which it may be assembled and operated, and it will also be obvious that my invention is susceptible of some change and modification, including variations in the shape and size of the parts, without departing from the principles and spirit thereof, and for this reason I do not wish to be understood as limiting myself to the precise arrangement and formation of the several parts herein shown in carrying out my invention in practice, except as claimed.

I claim:

In a universal joint, the combination which comprises a driving shaft having a C-shape yoke with spaced parallel arms extended from a straight back section thereof on the end with the arms extended beyond the end of the shaft, a driven shaft having a C-shape yoke with spaced parallel arms extended from a straight back section on the end thereof and positioned with the arms extended beyond the end of the said driven shaft, the arms of the said yokes having aligned bores therethrough and the axis of the bores of the arms of the yoke of the driven shaft being positioned at right angles to the axis of the bores of the arms of the yoke of the driving shaft, a rectangular-shape block positioned between the said parallel arms of the yokes, said block having recesses in the edges positioned between wings at the corners and the end surfaces of the wings forming the walls of the recesses being formed on radii the centers of which are positioned on the axes of the bores of the said parallel arms of the yokes, the end surfaces of edges of the block forming the bases of the said recesses having semi-spherical sockets therein the centers of which are also positioned on the axes of the bores of the arms of the yokes, internally threaded bushings with collars on the inner ends positioned in the said bores in the arms of the yokes, socket plugs threaded in said bushings and having semi-spherical sockets in the inner ends positioned to coact with the similarly shaped recesses in the edges of the said block, balls positioned between the arms of the yokes and block with parts thereof in the semi-spherical recesses of the block and parts in the sockets of the socket plugs, means limiting turning movement of the said bushings, and means limiting turning movement of the said socket plugs in the bushings, the said collars on the inner ends of the bushings being positioned in the recesses in the edges of the block with the peripheral surfaces thereof in engagement with the said end surfaces of the wings of the block whereby the said bushings provide journaling means between the arms of the yokes and block.

JOHN W. BLINKMAN.

REFERENCES CITED

The following references are of record in the file of this patent:

UNITED STATES PATENTS

| Number | Name | Date |
|---|---|---|
| 677,869 | Kinsler | July 9, 1901 |
| 1,358,221 | Leppert | Nov. 9, 1920 |
| 1,705,731 | Hufferd | Mar. 19, 1929 |
| 1,841,349 | Culbertson | Jan. 12, 1932 |
| 2,153,415 | Fett et al. | Apr. 4, 1939 |
| 2,170,315 | Wonderly | Aug. 22, 1939 |
| 2,255,172 | Johnson | Sept. 9, 1941 |

FOREIGN PATENTS

| Number | Country | Date |
|---|---|---|
| 11,769 | Great Britain | of 1915 |